United States Patent [19]

Hill et al.

[11] 3,912,119

[45] Oct. 14, 1975

[54] TRAILER HITCH

[76] Inventors: Wayland W. Hill, P.O. Box 168, Earlimart, Calif. 93319; Gary Lee Hill, 1408 Demare St., Visalia, Calif. 93277

[22] Filed: Jan. 31, 1975

[21] Appl. No.: 545,815

[52] U.S. Cl. ........................................... 280/478 A
[51] Int. Cl.² ........................................... B60D 1/16
[58] Field of Search ........ 280/478 A, 478 B, 478 R, 280/479 R

[56] References Cited
UNITED STATES PATENTS

| | | | |
|---|---|---|---|
| 3,099,462 | 7/1963 | Lent | 280/478 B |
| 3,126,210 | 3/1964 | Hill | 280/478 A |
| 3,266,818 | 8/1966 | Hill et al. | 280/478 B |
| 3,622,182 | 11/1971 | Grosse-Rhode | 280/478 A |
| 3,860,267 | 1/1975 | Lyons | 280/478 B |

*Primary Examiner*—Leo Friaglia
*Attorney, Agent, or Firm*—Huebner & Worrel

[57] ABSTRACT

An improved trailer hitch particularly suited for use in automatically establishing towing alignment for a nonaligned hitch point of a trailer adapted to be coupled to a draft vehicle. The invention is characterized by a housing having a bottom plate arranged in a horizontally oriented plane and a top plate disposed in spaced parallelism with the bottom plate and a pair of mutually converging, truncated side walls extended between the top and bottom plates for defining therebetween a pair of axially aligned throats. An extensible drawbar link is extended axially through said throats and supported for pivotal motion in a horizontal plane, while a locking mechanism is provided for automatically securing the link in both a retracted and centered position relative to the housing.

9 Claims, 12 Drawing Figures

TRAILER HITCH

BACKGROUND OF THE INVENTION

The invention generally relates to trailer hitches and more particularly to an improved trailer hitch adapted to be rigidly mounted on a draft vehicle and employed for automatically establishing towing alignment for a non-aligned coupling provided for one end of a trailer tongue, hereinafter referred to as a hitch point, for the sake of convenience only.

The prior art is, of course, replete with hitches, drawbar assemblies and similar devices particularly suited for use in coupling together draft and trailer vehicles. As herein employed, the term draft vehicle refers to any vehicle employed for pulling, towing, or otherwise drawing a trailer connected therewith, while the term trailer, as herein employed, refers to any device or implement which is designed to be pulled, towed or otherwise drawn by a draft vehicle. Moreover, it is to be understood that while the trailer hitch herein described has particular utility in connecting a wheeled trailer with a draft vehicle, it is to be understood that the utility of the trailer hitch is not so limited since the trailer hitch also may be employed in connecting implements exemplified by tractor-drawn farm implements to tractors and the like.

Among the numerous problems which continue to plague designers of trailer hitches, drawbar assemblies and the like, is that of providing a hitch which can be reconfigured between coupling and towing configurations for facilitating a rapid coupling of a non-aligned hitch point to a draft vehicle, followed by a rapid and automatic repositioning of the hitch point into towing alignment with the draft vehicle.

One trailer hitch which has experienced substantial success in solving this problem is the trailer hitch disclosed and claimed in applicants' prior United States Letters Patent No. 3,126,210. The patented trailer hitch includes an elongated pivotal drawbar assembly adapted to be connected at one end to a transverse member normally provided in the draft vehicle to which a trailer is to be connected. The drawbar assembly includes a spring-loaded locking pin for automatically locking the drawbar in a towing configuration once towing alignment has been achieved for the hitch point of a trailer thus connected with the draft vehicle.

While the patented trailer hitch has proven to be satisfactory, it has been found that in some instances difficulty has been encountered in achieving an automatic seating of the locking pin, particularly when the pivotal drawbar is placed under tension and pivotally displaced into its towing position.

Moreover, it has, in some instances, been found undesirable to connect the patented hitch to a transverse member normally provided for draft vehicles, since such members exhibit a propensity to deform under loads of the type applied thereto by the trailer hitch. Of course, once the member is deformed, the self-aligning characteristics of the patented trailer hitch assembly are impaired.

It is, therefore, a general purpose of the instant invention to provide a trailer hitch which overcomes the aforementioned objections and disadvantages.

OBJECTS AND SUMMARY OF THE INVENTION

It is, therefore, an object of the instant invention to provide an improved trailer hitch which overcomes the aforementioned difficulties and disadvantages.

It is another object to provide an improved trailer hitch particularly suited for use in connecting a non-aligned hitch point of a trailer to a draft vehicle.

It is another object to provide an improved trailer hitch which readily can be mounted on a Barton Bumper.

It is another object to provide an improved trailer hitch particularly suited to be mounted on substantially any flat surface of the draft vehicle.

It is another object to provide an improved trailer hitch particularly suited to be configured to a coupling configuration and thereafter automatically achieve a towing configuration in order to establish a towing alignment for a hitch point of a trailer.

It is another object to provide in a trailer hitch of the type including an elongated telescopic drawbar supported for pivotal motion in a horizontal plane, a pair of axially spaced locking mechanisms for automatically securing the drawbar in a towing position as towing alignment for the hitch point of the trailer is achieved.

Another object is to provide an improved trailer hitch which is particularly suited for connecting wheeled trailers with draft vehicles, although not necessarily restricted in use thereto.

These and other objects and advantages are achieved through the use of an improved trailer hitch which includes a drawbar supported for both pivotal and longitudinal motion in a horizontal plane and having a locking pin mounted on the drawbar for releasably securing the drawbar in a retracted configuration and a locking mechanism for automatically releasably securing the drawbar in centered alignment with the direction of travel of the draft vehicle as will hereinafter become more readily apparent by reference to the following description and claims in light of the accompanying drawings.

DESCRIPTION OF THE FIRST EMBODIMENT

Figure 1:
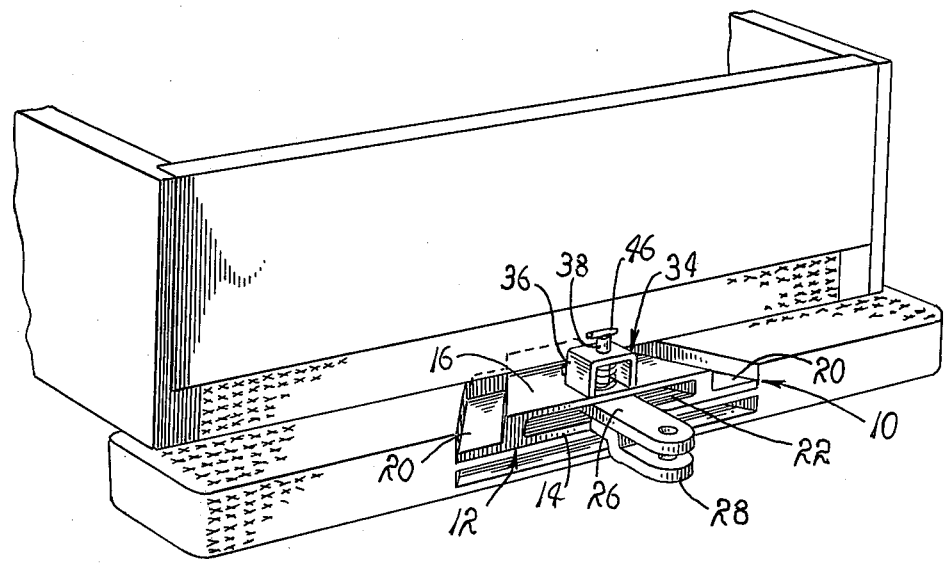
FIG. 1 is a perspective view of one embodiment of the instant invention comprising an improved trailer hitch, including a pivotal drawbar link, mounted on a so-called Barton Bumper.
Figure 2:
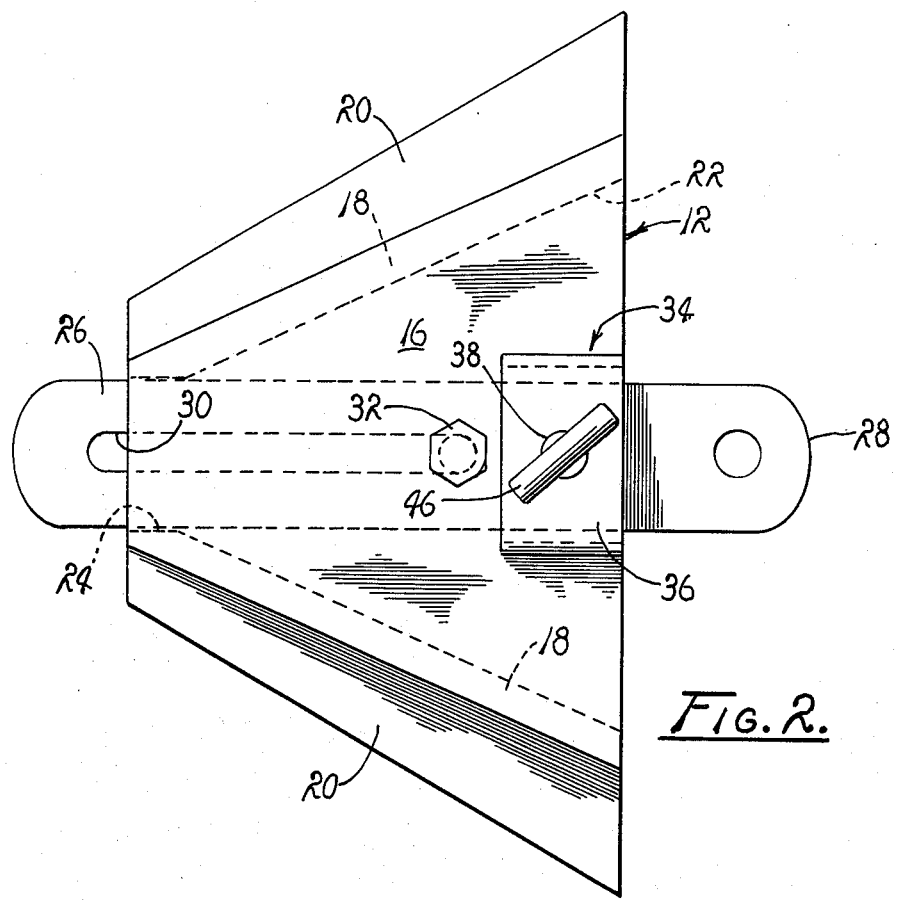
FIG. 2 is a top plan view of the trailer hitch shown in FIG. 1.

Referring now to the drawings wherein like reference characters designate like or corresponding parts throughout the several views, there is shown in FIG. 1 a trailer hitch, generally designated 10, comprising a first embodiment of the instant invention.

The trailer hitch, generally designated 10, as shown in FIG. 1, is particularly suited to be mounted in the recess of a rigid bumper of a draft vehicle. As a practical matter, the trailer hitch 10 is particularly suited to be mounted, as by welding, bolting, or the like, on suitable flat surfaces found at the rear of draft vehicles. For example, the so-called Barton Bumper includes a recess within which the trailer hitch 10 is readily receivable for purposes of mounting the trailer hitch.

The hitch 10 includes a housing 12 having a bottom plate 14 and a top plate 16 disposed in spaced parallelism with the bottom plate. Between the bottom plate and top plate, there is a pair of mutually converging side plates 18. These plates are rigidly fixed to both the bottom and top plates, 14 and 16 respectively, as by welding or the like. From opposite sides of the housing 12 there is extended a shirt 20 of a planar configuration which serves as a mounting bracket through which the trailer hitch 10 is fixed in place aboard a draft vehicle.

It is important here to note that the plates 14 and 16, along with the converging side plates 18, define a throat 22 and a throat 24 disposed in coaxial alignment with the first throat 22. The throats 22 and 24 are of rectangular configurations with the throat 22 having the greatest width. The purpose for the difference in dimensions will hereafter be fully understood. As a practical matter, the throat 22 faces rearwardly, when the hitch is mounted in place aboard a draft vehicle, and hence can be considered to be a rearward throat while the throat 24 faces forwardly, and can, therefore, be considered to be a forward throat.

Figure 4:
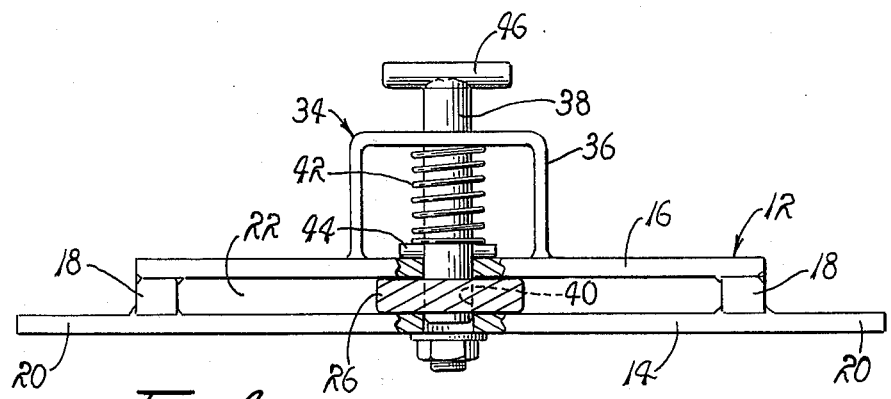
FIG. 4 is an end elevational view of the trailer hitch.
Figure 5:
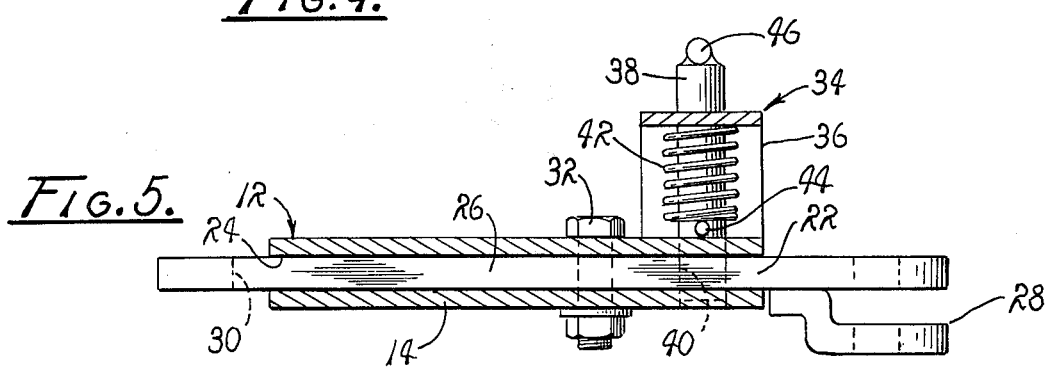
FIg. 5 is a cross-sectional view of the hitch shown in FIGS. 1 through 4, taken generally along line 5—5 of FIG. 3.

Extended axially from the rearward throat 22 there is a drawbar link 26 having, preferably, a clevis 28 affixed to its distal end for receiving the hitch point of a trailer, not shown. The thickness dimension of the drawbar link 26, as illustrated in FIg. 4, is slightly less than the height dimension of the side plates 18 so that motion, both axial and pivotal, of the drawbar link is accommodated. This motion facilitates a repositioning of the clevis 28, relative to a selected hitch point, for purposes of affording a coupling of the hitch point to the drawbar link 26.

Figure 3:
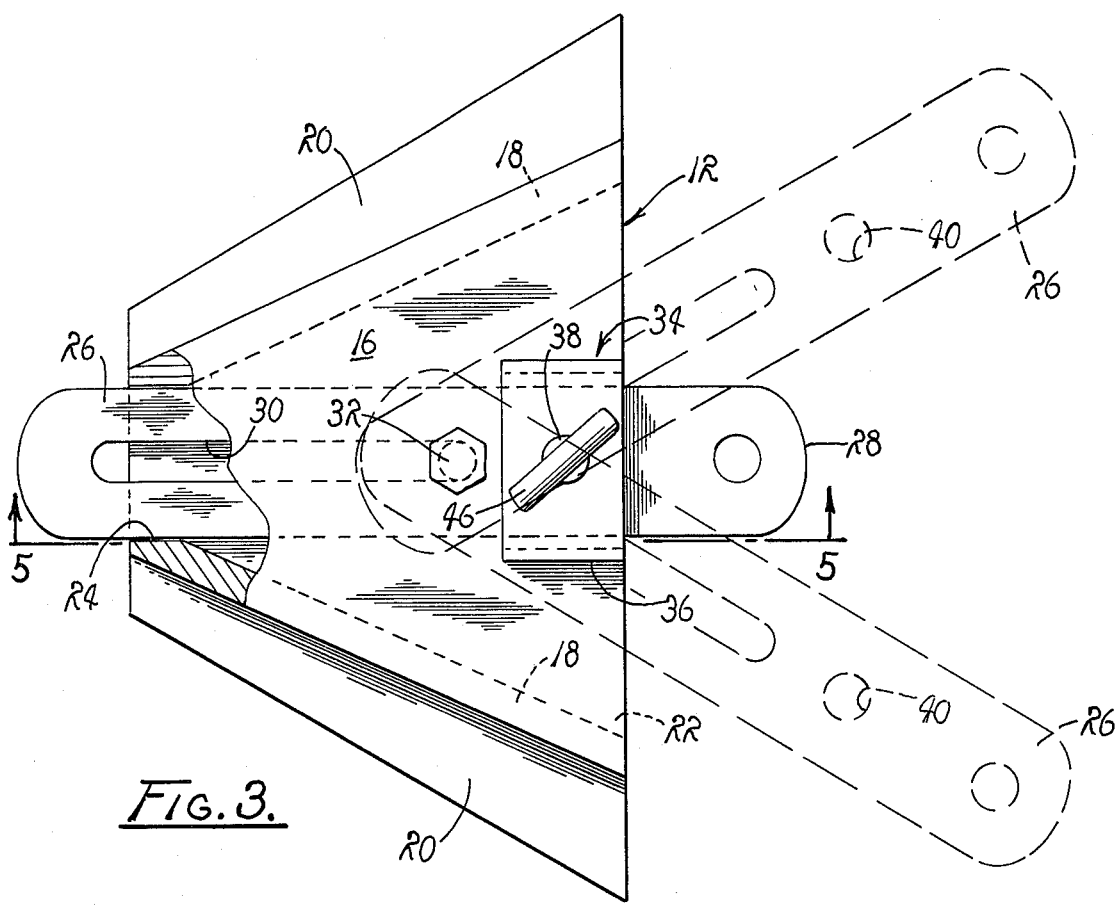
FIG. 3 is a top plan view of the trailer hitch, illustrating alternate positions for the link.

As best illustrated in FIG. 3, the draw bar link 26 includes an elongated slot 30. This slot is extended in an axial direction from a point located near the end of the link 26 opposite the clevis 28 to a point slightly beyond the midpoint of the link. Through this slot there is extended a pivot pin 32 about which the link 26 is permitted to oscillate, when extended relative to the housing in response to axial motion imparted thereto and accommodated by the slot 30.

In practice, the pivot pin 32 is a hardened cap screw and is extended through a pair of coaxially aligned apertures, not designated, formed in the bottom and top plates, 14 and 16 respectively. This pin is secured in place by a suitable nut, also not designated. It should, therefore, be apparent that the drawbar link 26 is thus supported for motion in axial directions for accommodating extension and retraction relative to the housing 12, as well as for angular displacement about the pivot pin 32 limited by the side plates 18.

The forward throat 24 is dimensioned only slightly greater than the cross-sectional dimension of the draw bar link 26. Consequently, once the drawbar link 26 is inserted into the forward throat 24, pivotal motion of the link about the pivot pin 32 necessarily is precluded. Moreover, due to the mutual convergence of the side plates 18, insertion of the drawbar link 26 into the forward throat 24 is achieved, with minimal difficulty, as axial motion in a forward direction is imparted to the link 26 for retracting the link relative to the housing 12. As a practical matter, the forward end of the link 26 is slightly rounded to enhance a sliding of the end surface of the drawbar link along the adjacent surfaces of the side plates 18. Hence, the rounded end surface of the link 26 and the opposed surfaces of the side plates 18 function as bearing surfaces.

In order to secure the drawbar link 26 in a retracted position relative to the housing 12, there is provided a spring-biased locking pin assembly 34. This assembly is supported by a suitable bracket 36, of an inverted U-shaped configuration having a pair of vertically oriented legs, the lowermost ends of which are welded or otherwise rigidly secured to the top plate 16 of the housing 12.

Provided in coaxial alignment within the bracket 36, the top plate 16, and the bottom plate 14, there is a plurality of pin-receiving apertures, not designated, through which is extended an axially displaceable locking pin 38. The locking pin 38 normally is seated in the apertures formed in the bracket 36 and the plate 16. However, in order to permit the locking pin to be extended through the pin-receiving aperture formed in the bottom plate 14, the drawbar link 26 also is provided with a pin-receiving aperture, designated 40, which can become coaxially aligned with the locking pin 38 only when the drawbar link 26 is retracted relative to the housing 12 to thus impart a towing configuration to the hitch 10.

In order to assure that the locking pin 38 is extended through the pin-receiving aperture 40, there is provided a compression spring 42 of a helical configuration concentrically related to the locking pin 38. As a practical matter, a keeper pin 44 is extended through the locking pin 38 and serves to couple the spring 42 to the locking pin in a manner such that the locking pin is confined between the bracket and the keeper and caused to continuously urge the pin to advance in axial displacement toward the drawbar link 26 for forcing the pin through the aperture 40 once coaxial alignment therebetween is established.

In order to release the drawbar link 26 for reconfiguring the hitch 10 to a coupling configuration, the locking pin 38 is provided with a T-handle 46 welded or otherwise rigidly connected with the locking pin 38 which facilitates an extraction of the locking pin from the aperture 40.

OPERATION OF THE FIRST EMBODIMENT

While the operation of the embodiment heretofore disclosed is believed to be apparent, it will be reviewed at this point.

With the trailer hitch 10 assembled in the manner hereinbefore described, and mounted on a member such as a bumper of a draft vehicle, the trailer hitch is prepared for operation. In employing the hitch, the draft vehicle to which it is attached is rearwardly advanced for positioning the clevis 28 of the drawbar link 26 as near as practical to the hitch point of a given trailer to be coupled in a towing relationship with the draft vehicle. The drawbar link 26 is released, simply by lifting the locking pin 38 for thus extracting the locking pin from the pin-receiving aperture 40 of the drawbar link.

The drawbar link 26 is advanced axially, in a rearward direction, for extending it from the forward throat 24. Once the drawbar link 26 is extended, pivotal motion is imparted thereto for placing the clevis 28 in a coupling relationship with the hitch point, as illustrated in FIG. 3. Thus a coupling configuration is imparted to the hitch.

Once coupling of the clevis 28 with a hitch point is completed, the operation of the draft vehicle advances the draft vehicle sufficiently for bringing the link 26 into substantial alignment with the longitudinal axis of the draft vehicle. At this point, the operator reverses the direction of travel for the draft vehicle causing the drawbar link 26 to advance forwardly, with respect to the housing 12. As the drawbar link 26 is advanced forwardly, the forwardmost end thereof is guided into the forward throat 24 by the adjacent surfaces of the side plates 18. Thus the side plates 18 cause the drawbar link 26 to assume proper alignment as they urge the link to rotate about the pivot pin 32. Continued forward motion of the drawbar link 26 causes the pin-receiving aperture 40 to assume a coaxial alignment with the locking pin 38. At the instant coaxial aligment is assumed by the pin-receiving aperture 40, relative to the locking pin 38, the spring 42 serves to drive the locking pin 38 through the pin-receiving aperture 40 and thence through the pin-receiving aperture formed in the bottom plate 14.

It will, therefore, be appreciated that the hitch point connected with the drawbar link 26 through the clevis 28 is brought into and secured in towing alignment with the draft vehicle as the hitch 10 is thus reconfigured to a towing configuration.

DESCRIPTION OF THE SECOND EMBODIMENT

Figure 6:
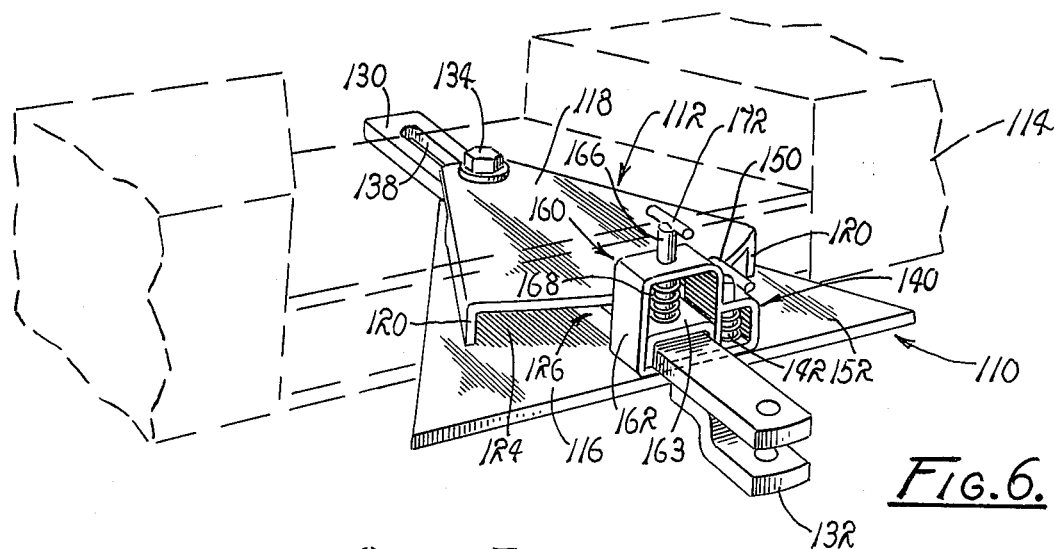
FIG. 6 is a perspective view of another embodiment of the invention including a drawbar assembly having a pivotal drawbar link.
Figure 7:
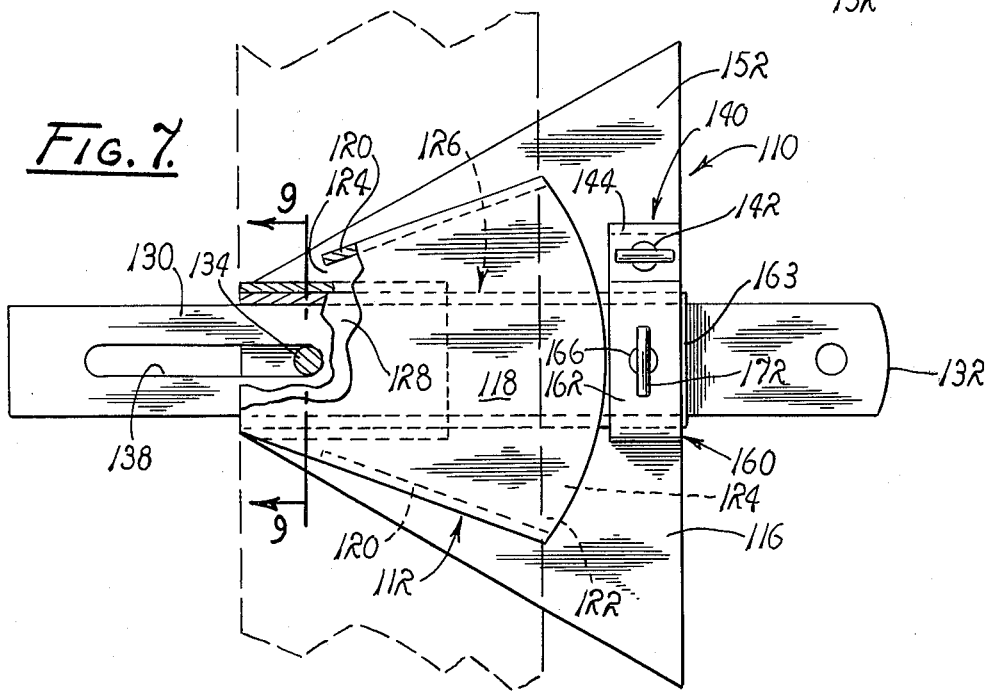
FIg. 7 is a top plan view of the trailer hitch shown in FIG. 6.
Figure 8:
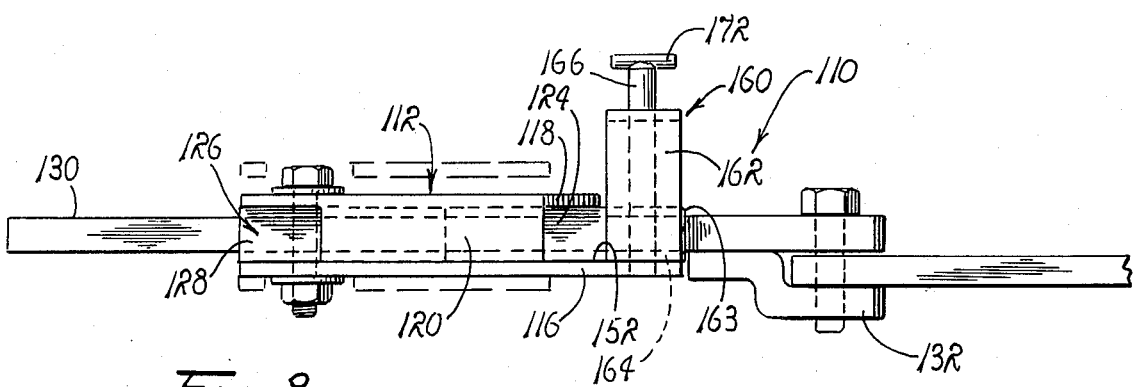
FIG. 8 is a side elevational view of the trailer hitch shown in FIG. 6.
Figure 9:
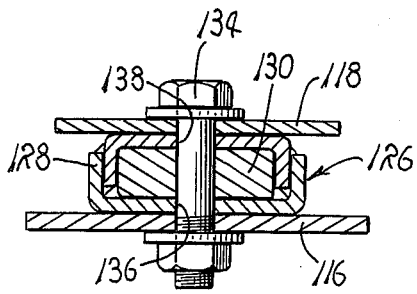
FIG. 9 is a cross-sectional view of the drawbar assembly shown in FIG. 6.
Figure 10:
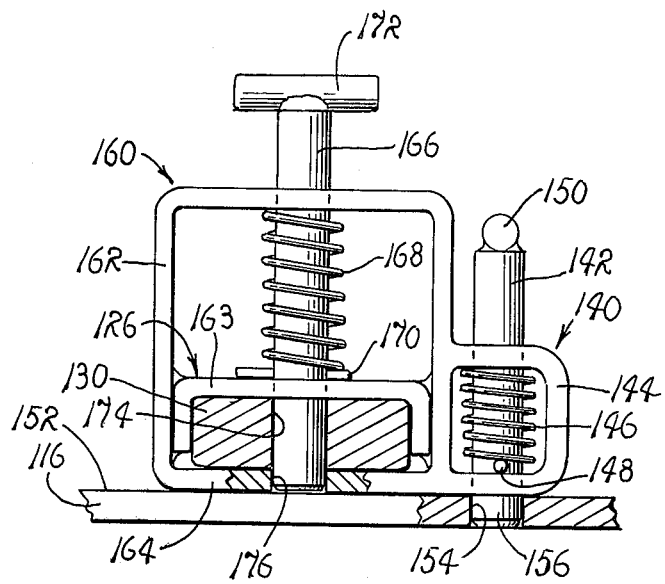
FIG. 10 is a partial cross-sectional view of the hitch shown in FIG. 6.
Figure 11:
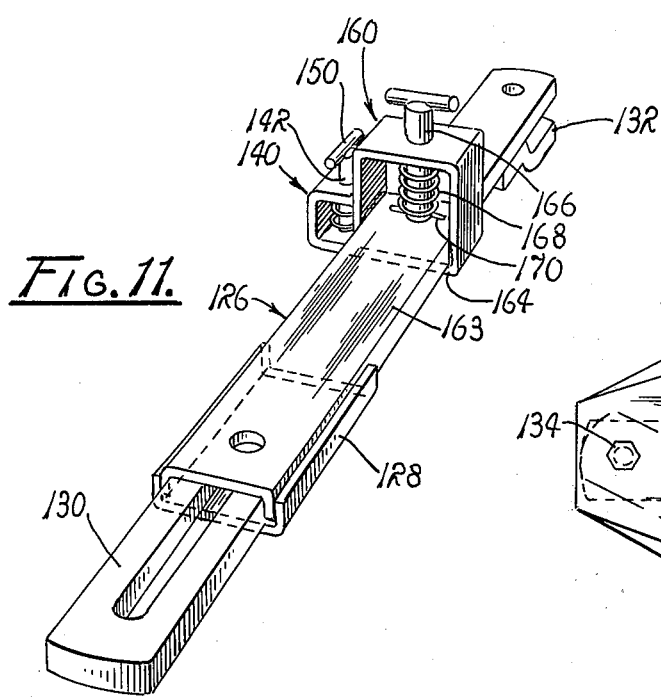
FIG. 11 is a perspective view of the drawbar assembly shown in FIG. 6.

Turning now to FIG. 6, there is disclosed another embodiment of the invention, generally designated 110.

The trailer hitch 110, similar to the hitch 10 heretofore described, includes a housing 112 particularly suited for mounting on any flat surface such as the flat surface found on or beneath a bumper, designated 114, of a draft vehicle. As a practical matter, the housing 112 is of an all-welded steel construction, through which ruggedness is imparted to the hitch.

The housing 112 includes a bottom plate 116 of a substantially triangular configuration and a top plate 118 also of a substantially triangular configuration. However, the dimensions of the plates 116 and 118 differ substantially so that the top plate 118 is substantially smaller than the bottom plate 116, for mounting purposes.

The bottom plate 116 and top plate 118 are interconnected through a pair of truncated converging side walls 120 which, in effect, serve to establish a rearward throat 122 located at the aft or trailing end of the housing 112, when mounted on the bumper 114, and a forward throat 124 coaxially aligned with the throat 122 at the forward or leading end of the housing.

Through the throats 122 and 124 there is extended a telescopic drawbar assembly, generally designated 126. The drawbar assembly 126 is, in many respects, similar to the drawbar disclosed in applicants' patent, aforementioned. The drawbar assembly 126 includes an elongated sleeve 128 of a substantially rectangular cross-sectional configuration within which there is disposed an elongated drawbar link 130, also of a substantially rectangular cross-sectional configuration. The drawbar link 130 includes at its trailing or distal end a bifurcated coupling or clevis 132 which serves to receive the hitch point of a trailer in a pivotally connected relationship.

In order to impart to the hitch 110 a coupling configuration, the drawbar assembly 126 is pivotally connected to the housing through a pivot pin 134 which extends through the plates 116 and 118 as well as the sleeve 128 and drawbar link 130. In practice, a hardened cap screw also serves quite satisfactorily for this purpose. However, in order to achieve a pivotal connection of the drawbar assembly 126 with the housing 112, the sleeve 128 is provided with a pair of coaxially aligned apertures, not designated, which serve to receive the pivot pin 134. It is important to note that the drawbar link 130 also includes an elongated slot 136 through which the pivot pin 134 is extended. The opposite ends of this slot, in effect, limit the longitudinal displacement of the link 130 relative to the sleeve 128.

Release of the pivot pin 134, in practice, permits the hitch to be reconfigured to a coupling configuration wherein the drawbar assembly 126 is free to swing in horizontal directions for repositioning the clevis 132 into a connecting relationship with the hitch point of a trailer, as well as to permit the drawbar link to extend and retract relative to the housing 112.

Of course, once the draft vehicle on which the hitch 110 is mounted is pulled forwardly, the drawbar assembly 126 is caused to center itself in a towing position such that the hitch point of the trailer is in towing alignment with the draft vehicle.

In order to secure the drawbar assembly 126 in its towing position, and thus secure the hitch in its towing configuration, there is provided a spring-biased locking pin 142 mounted in a bracket 144 welded or otherwise suitably secured to the sleeve 128 of the drawbar assembly 126. The bracket 144 is of a U-shaped configuration and includes a pair of coaxially aligned pin-receiving apertures, not designated, through which the locking pin 142 is axially extended. Within the bracket, between the pin-receiving apertures, through which the locking pin 142 is extended, there is seated in concentric relation with the locking pin a compression spring 146. The uppermost end of the spring 146 is arranged in an abutting relationship with the bracket 144 while the lowermost end thereof is connected with the locking pin 142 by a keeper pin 148 extended diametrically through the locking pin 144. The opposite ends of the keeper pin 148 are arranged to abut the adjacent surface of the bracket 144 and thus function as a limiting stop for arresting axial motion imparted to the locking pin by the compression spring 146. Where desired, a T-handle 150 is rigidly connected to the uppermost end of the locking pin for facilitating manipulation thereof.

Due to the fact that the bottom plate 116 is substantially larger than the top plate 118, the bottom plate 116 projects outwardly from the housing 112 and thus provides an apron 152 across which the locking pin assembly 140 is permitted to sweep as pivotal motion is imparted to the drawbar assembly 126. Within the apron 152 there is provided a pin-receiving opening 154 which serves to receive the lowermost end, designated 156, of the locking pin 142, as it is caused to extend from the bracket 144 under the influence of the compression spring 146. Once the end portion 156 of the locking pin 142 is received within the pin-receiving opening 154, pivotal motion of the drawbar 126 is arrested.

Once a hitch point for a selected trailer is connected to the clevis 132, the drawbar link 130 is retracted relative to the sleeve 128 to its towing position to thus impart to the hitch a towing configuration. Normally, this is achieved simply by advancing the draft vehicle toward the hitch point. Preferably, this is effected subsequent to the drawbar assembly 126 being secured in its towing position by the arresting pin assembly 140.

In order to secure automatically the drawbar link 130 in its towing position, there is provided an arresting pin assembly 160. The arresting pin assembly 160 also includes a bracket 162 of an inverted U-shape configuration which includes a base plate, not designated, extended between a pair of vertically oriented legs, also not designated. As a practical matter, the ends of the legs of the bracket are extended horizontally beneath an axially projected segment 163 of the sleeve 128 to which the bracket is attached. The end of the legs thus serve as a wear plate, designated 164.

Formed within the base plate of the bracket 162 and the top surface of the segment 163 of the sleeve 128, there is a pair of coaxially aligned bores, not designated, which receive in sliding engagement an axially displaceable locking pin 166. Concentrically related to the locking pin 166, in an interposed relationship between the segment 163 of the sleeve 128, and the base of the bracket 162, there is a compression spring 168. The compression spring 168 is connected with the locking pin 166 by a keeper pin 170 extended diametrically through the locking pin in a manner such that the compression spring continuously urges the locking pin 166 to extend downwardly through the bore formed in the segment 163 of the sleeve 128. As a practical matter, the keeper pin 170 also serves as a motion limiting stop for arresting the downward motion of the pin 166. In practice, a T-handle 172 is provided for facilitating a manipulation of the locking pin 166.

It is important to note that the drawbar link 130 also includes an aperture 174 so positioned as to become coaxially aligned with the locking pin 166 when the drawbar link 130 is retracted relative to the sleeve 128, to its towing position. Moreover, formed within the wear plate 164, in coaxial alignment with the locking pin 166, there is a pin-receiving opening 176 which serves to receive the pin 166 once it is extended through the drawbar link for locking the drawbar link 130 in its towing position.

Hence, it will be appreciated that once the draft vehicle is advanced toward the hitch point of the trailer a distance sufficient for forcing the drawbar link 130 into its retracted position, the aperture 174 within the drawbar link 130 is brought into coaxial alignment with the locking pin 166 and the pin-receiving opening 176. At this time, the compression spring 168 serves to force the locking pin 166 through the aperture 174 into a seated relationship with the pin-receiving opening 176 for thus securing the coupling link in its retracted or towing position.

OPERATION OF THE SECOND EMBODIMENT

While the operation of the embodiment illustrated in FIGS. 6 through 12 is believed to be apparent, it will be reviewed at this point.

With the trailer hitch 110 assembled in the manner hereinbefore designated, and rigidly affixed, as by welding or the like, to a flat horizontally oriented surface such as a bumper 114 provided at the rear of a draft vehicle, the trailer hitch is readied for operation.

Figure 12:
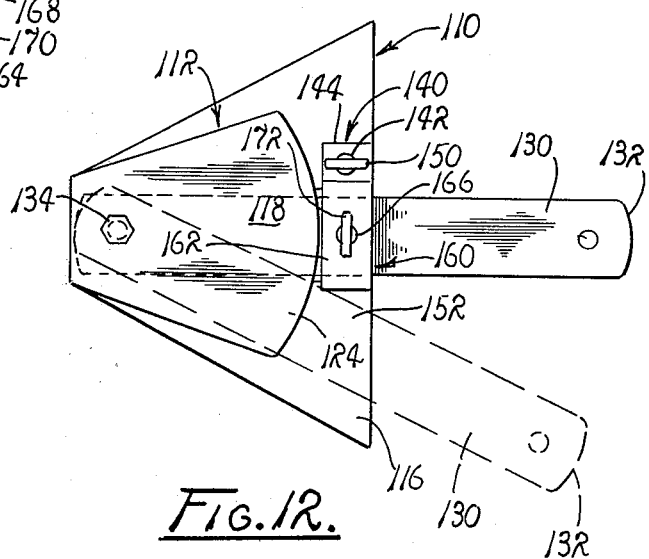
FIg. 12 is a top plan view of the hitch shown in FIG. 6, illustrating alternate positions for the link.

In employing the trailer hitch, an operator advances the draft vehicle to which the trailer hitch is attached in a direction for approaching the hitch point of a selected trailer. In the event the hitch point is out of towing alignment with the trailer hitch, the operator merely elevates the locking pin 142, whereupon the drawbar 126 is released for pivotal motion toward the hitch point of the trailer, as illustrated in FIG. 12. In most instances, the clevis 132 of the drawbar link 130 will not be extended sufficiently for accommodating a connection of the hitch point of the trailer with the clevis 132 provided at the distal end with the drawbar link 130. In order to facilitate an extension of the drawbar 126, the operator manipulates the locking pin 160 and thus elevates it sufficiently for withdrawing it from the aperture 174 in the drawbar link 130. Once the pin 166 is withdrawn from the aperture 174, the drawbar link 130 is released for longitudinal movement into a coupling relationship with the hitch point. Thus the hitch 110 is reconfigured to a coupling configuration.

Once the trailer is connected with the clevis 132, the operator of the draft vehicle advances the vehicle in a direction suitable for bringing the hitch point of the trailer into towing alignment with the trailer hitch 110. As the drawbar assembly 126 is pivotally displaced to its towing position, the motion arresting assembly 140 automatically serves to lock the drawbar assembly 126 in its towing position by forcing the locking pin 142 downwardly into the pin-receiving opening 154.

In order to return the drawbar link 130 to its towing position, wherein it is retracted with respect to the sleeve 128, the operator of the draft vehicle merely reverses the direction of travel for the vehicle sufficient for causing the aperture 174 to align itself with the locking pin 166 whereupon the motion arresting assembly is rendered effective for locking the drawbar link 130 in its towing position. This is achieved as the locking pin 166 is axially advanced through the aperture 174 into the pin-receiving opening 176 under the influence of the compression spring 168 acting against the keeper pin 170. Thus a towing configuration automatically is imparted to the hitch 110.

In view of the foregoing, it should readily be apparent that the trailer hitches of the instant invention provide practical solutions to the problems heretofore encountered in automatically achieving towing alignment for non-aligned hitch points of trailers and the like.

Although the invention has been herein shown and described in what are conceived to be the most practical and preferred embodiments, it is recognized that departures may be made therefrom within the scope of the invention, which is not to be limited to the illustrative details disclosed.

Having described our invention, what we claim as new and desire to secure by Letters Patent is:

1. An improved trailer hitch adapted to be rigidly mounted on a draft vehicle and employed for automatically establishing towing alignment for a non-aligned hitch point of a trailer adapted to be coupled to the draft vehicle comprising:
    A. a housing including a bottom plate arranged in a substantially horizontally oriented plane, a top plate disposed in spaced parallelism with the bottom plate, and a pair of mutually converging, truncated side walls extended between the bottom and top plates of said housing;
    B. an extensible link extended from said housing and adapted to receive in connected relation a hitch point of a selected trailer having a substantially rectangular cross-sectional configuration and supported for longitudinal displacement between a towing position, wherein the link is retracted relative to said housing, and a coupling position wherein the link is extended relative to said housing;
    C. means for supporting the link for pivotal displacement in a horizontal plane from a substantially centered position relative to said housing, including a pair of coaxially aligned pin-receiving openings defined in said bottom and top plates, means defining in said link an axially extended slotted opening, and a pivot pin extended through said slotted opening and seated in said pair of pin-receiving openings;
    D. first motion arresting means disposed in spaced relation with said pivot pin for releasably securing the link against angular displacement about the pivot pin; and
    E. second motion arresting means for releasably securing said link against longitudinal displacement including an elongated, spring-biased locking pin supported for axial motion in substantially vertical directions along a path extended through said drawbar, means defining a pair of pin-receiving apertures disposed at opposite sides of said link in coaxial alignment with said spring-biased locking pin, and means defining in said link another pin-receiving aperture arranged in coaxial alignment with said pair of pin-receiving apertures when the drawbar link is in its towing position.

2. An improved trailer hitch comprising:
    A. a housing including a base plate and a top plate disposed in spaced parallelism with said base plate;
    B. a telescopic drawbar assembly projected from said housing including a sleeve and a concentrically related link supported for pivotal displacement about an axis passing through one end thereof and axial displacement between extended and retracted positions relative to said housing;
    C. first motion arresting means connected to said drawbar assembly for releasably securing said assembly to said base plate for supporting said link against pivotal displacement including a spring-biased locking pin mounted on said assembly; and
    D. second motion arresting means mounted on said drawbar assembly for releasably securing said link in a retracted position relative to said base plate.

3. The hitch of claim 2 wherein said housing further includes a pair of converging side walls for limiting pivotal displacement imparted to said link.

4. The hitch of claim 2 wherein said base plate includes an apron of a substantially planar configuration projected from said housing in parallelism with said top plate.

5. The hitch of claim 4 wherein said first motion arresting means further includes means defining a pin-receiving aperture in said apron for receiving said locking pin as pivotal displacement is imparted to said drawbar assembly.

6. The hitch of claim 2 wherein said second motion arresting means includes an elongated, spring-biased locking pin mounted on said drawbar assembly and supported for motion in axial directions along a vertically oriented path transversely related to said link, and means defining in said apron a pin-receiving aperture disposed in coaxial alignment with said spring-biased locking pin.

7. An improved trailer hitch comprising:
    A. housing including a base plate;
    B. an axially extensible drawbar link;
    C. means for supporting said link for pivotal displacement, about an axis passing through one end thereof, and axial displacement between extended and retracted positions relative to said base plate, including a vertically oriented pivot pin extended through said link;
    D. first motion arresting means for automatically releasably securing said link to said plate for supporting the link against pivotal displacement, including means defining in said housing a link-confining throat disposed in spaced relation with said pivot pin having a width slightly greater than the width of said link for receiving one end of the link; and
    E. second motion arresting means including a spring-biased locking pin for automatically releasably securing said link in a retracted position relative to said plate.

8. The trailer hitch of claim 7 wherein said housing is further characterized by another throat, disposed in spaced coaxial relation with said link-confining throat, through which said drawbar link is extended.

9. The trailer hitch of claim 8 wherein the means for supporting said link further includes means defining in said link an axially extended slot, and a pivot pin mounted on said housing and extended through said slot.

* * * * *

UNITED STATES PATENT OFFICE
CERTIFICATE OF CORRECTION

Patent No. 3,912,119          Dated October 14, 1975

Inventor(s) Wayland W. Hill and Gary Lee Hill

It is certified that error appears in the above-identified patent and that said Letters Patent are hereby corrected as shown below:

Column 3, line 28, delete "shirt" and insert ---skirt---.

line 47, delete "FIg" and insert ---Fig".

Signed and Sealed this twenty-third Day of December 1975

[SEAL]

Attest:

RUTH C. MASON
*Attesting Officer*

C. MARSHALL DANN
*Commissioner of Patents and Trademarks*